United States Patent
Wu et al.

(10) Patent No.: US 7,502,195 B1
(45) Date of Patent: Mar. 10, 2009

(54) COMPENSATING FOR THERMAL EXPANSION WHEN WRITING SPIRAL TRACKS TO A DISK OF A DISK DRIVE

(75) Inventors: Hsueh-Chieh Wu, Mountain View, CA (US); Kenneth R. Kon, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 33 days.

(21) Appl. No.: 11/704,478

(22) Filed: Feb. 9, 2007

(51) Int. Cl.
*G11B 21/02* (2006.01)

(52) U.S. Cl. .................................................. 360/75
(58) Field of Classification Search ................. None
See application file for complete search history.

(56) References Cited

U.S. PATENT DOCUMENTS

| | | | |
|---|---|---|---|
| 4,107,746 | A | 8/1978 | Conway |
| 5,010,535 | A | 4/1991 | Davis |
| 5,668,679 | A | 9/1997 | Swearingen et al. |
| 6,091,564 | A | 7/2000 | Codilian et al. |
| 6,507,450 | B1 | 1/2003 | Elliott |
| 6,937,420 | B1 | 8/2005 | McNab et al. |
| 6,943,978 | B1 | 9/2005 | Lee |
| 6,967,799 | B1 | 11/2005 | Lee |
| 6,977,789 | B1 * | 12/2005 | Cloke ........................... 360/75 |
| 6,985,316 | B1 | 1/2006 | Liikanen et al. |
| 6,992,848 | B1 | 1/2006 | Agarwal et al. |
| 6,992,852 | B1 * | 1/2006 | Ying et al. ...................... 360/75 |
| 7,002,761 | B1 | 2/2006 | Sutardja et al. |
| 7,016,134 | B1 | 3/2006 | Agarwal et al. |
| 7,054,083 | B2 | 5/2006 | Ehrlich |
| 7,088,533 | B1 | 8/2006 | Shepherd et al. |
| 7,145,744 | B1 | 12/2006 | Clawson et al. |
| 2003/0197968 | A1 | 10/2003 | Sacks et al. |
| 2006/0007585 | A1 | 1/2006 | Ehrlich et al. |
| 2006/0103967 | A1 * | 5/2006 | Kim et al. ...................... 360/75 |
| 2006/0171058 | A1 | 8/2006 | Chan et al. |
| 2006/0171059 | A1 | 8/2006 | Chan et al. |

OTHER PUBLICATIONS

US 6,906,885, 06/2005, Agarwal et al. (withdrawn)

* cited by examiner

*Primary Examiner*—Andrew L Sniezek
(74) *Attorney, Agent, or Firm*—Howard H. Sheerin, Esq.

(57) ABSTRACT

A method is disclosed for writing M spiral tracks (i=1 to M) to a disk of a disk drive. A head is positioned over a first radial location to write a concentric reference track comprising N concentric servo sectors. Prior to writing one of the spiral tracks, the concentric reference track is read and a position error signal first_$PES_i(j)$ is generated for at least one of the servo sectors j in the concentric reference track, wherein the first_$PES_i(j)$ represents an offset of the head from the first radial location, and the servo sector j corresponds to a circumferential location of the spiral track. At least one of a starting radial location and a velocity profile is adjusted in response to the first_$PES_i(j)$, and the spiral track is written to the disk using the starting radial location and the velocity profile.

18 Claims, 10 Drawing Sheets

COMPENSATING FOR THERMAL EXPANSION WHEN WRITING SPIRAL TRACKS TO A DISK OF A DISK DRIVE

BACKGROUND

1. Field

The present invention relates to disk drives for computer systems. More particularly, the present invention compensates for thermal expansion when writing spiral tracks to a disk of a disk drive.

2. Description of the Related Art

Figure 1:
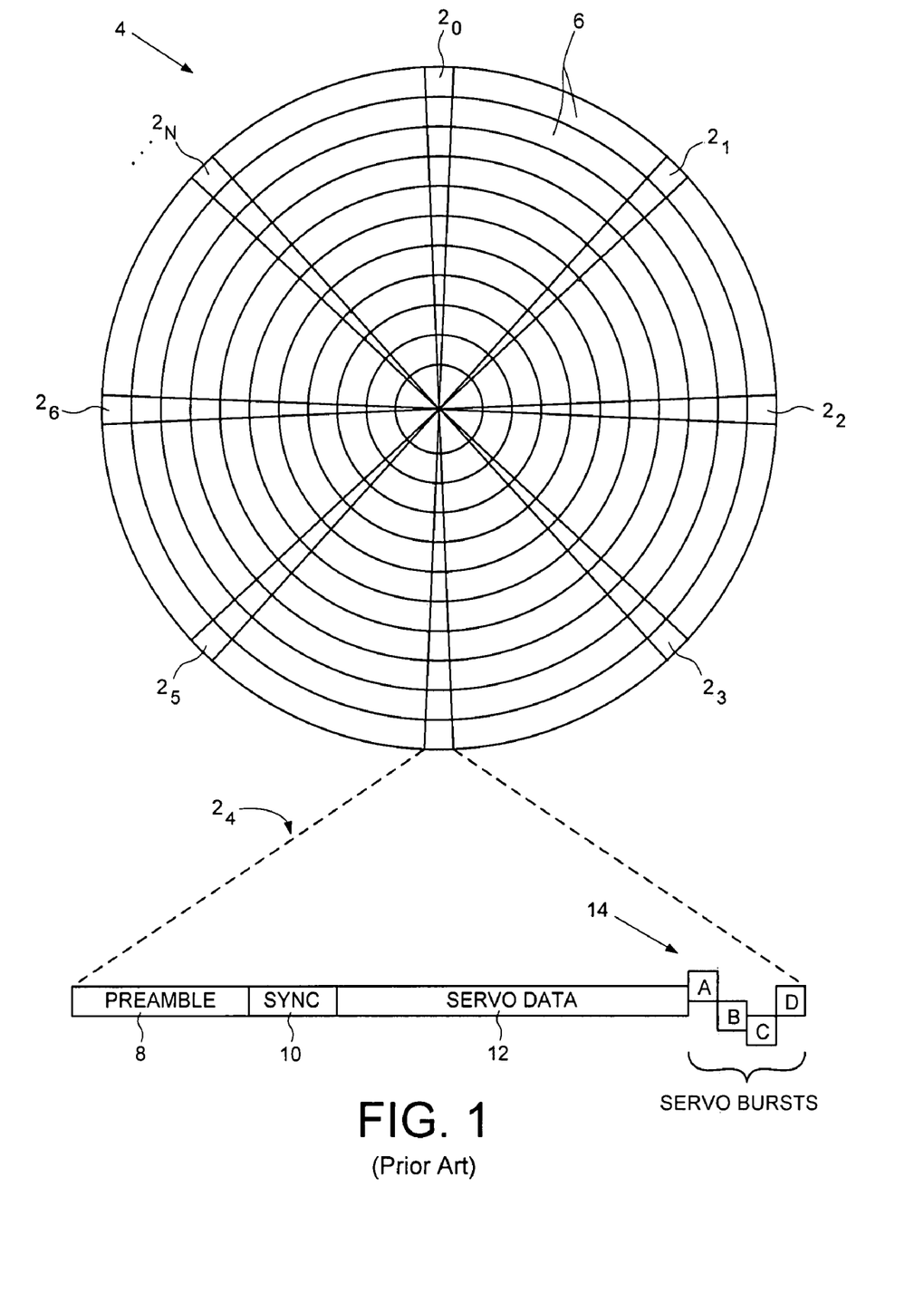
FIG. 1 shows a prior art disk format including a plurality of concentric servo tracks defined by a plurality of embedded servo sectors.

When manufacturing a disk drive, product servo sectors $2_0$-$2_N$ are written to a disk 4 which define a plurality of radially-spaced, concentric servo tracks 6 as shown in the prior art disk format of FIG. 1. The product servo sectors are said to form servo wedges or servo spokes from the outer to inner diameter of the disk. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the servo write clock is used to write the product servo sectors at the appropriate circular location as well as at the appropriate frequency.

In order to write the product servo sectors at the proper disk locations during the self-servo writing operation, it is important for the spiral tracks to be written to the disk with a uniform spacing between the spiral tracks. If an external spiral servo writer is used to write the spiral tracks individually, various components of the external spiral servo writer as well as the disk itself may experience thermal expansion. In addition, the effect of thermal expansion may not be uniform around the circumference of the disk (relative to the head). If the spiral tracks are written without compensating for this thermal expansion, the resulting non-uniform spacing between the spiral tracks may degrade and/or render the product servo sectors inoperable.

There is, therefore, a need to compensate for thermal expansion when writing spiral tracks to a disk of a disk drive.

SUMMARY OF THE INVENTION

An embodiment of the present invention comprises a method of writing M spiral tracks (i=1 to M) to a disk of a disk drive. A head is positioned over a first radial location and a first concentric reference track is written, the first concentric reference track comprising N concentric servo sectors. Prior to writing one of the spiral tracks, the head is positioned over the first concentric reference track to read the first concentric reference track. A position error signal first_$PES_i(j)$ is generated for at least one of the servo sectors j in the first concentric reference track, wherein the first_$PES_i(j)$ represents an offset of the head from the first radial location, and the servo sector j corresponds to a circumferential location of the spiral track. At least one of a starting radial location and a velocity profile is adjusted in response to the first_$PES_i(j)$, and the spiral track is written to the disk using the starting radial location and the velocity profile.

In one embodiment, adjusting at least one of the starting radial location and the velocity profile in response to the first_$PES_i(j)$ compensates for uniform and non-uniform thermal expansion.

In another embodiment, after writing the first concentric reference track to the disk, the head is positioned over the first concentric reference track, the concentric servo sectors in the first concentric reference track are read, and a position error signal first_$PES_0(n)$ is generated for each servo sector (n=1 to N) representing an offset from the first radial location. Prior to writing the spiral track, a distance delta D_Δ is generated relative to a difference between the first_$PES_0(j)$ and the first_$PES_i(j)$, wherein at least one of the starting radial location and the velocity profile is adjusted in response to the distance delta D_Δ.

In another embodiment, the head is positioned over a second radial location and a second concentric reference track is written at the second radial location, the second concentric reference track comprising N concentric servo sectors. Prior to writing one of the spiral tracks, the head is positioned over the second concentric reference track and a position error signal second_$PES_i(j)$ is generated for at least one of the servo sectors j in the second concentric reference track representing an offset from the second radial location, the servo sector j corresponding to a circumferential location of the spiral track. At least one of the starting radial location and the velocity profile is adjusted in response to the first_$PES_i(j)$ and the second_$PES_i(j)$. In one embodiment, the first radial location is near an outer diameter of the disk, and the second radial location is near an inner diameter of the disk.

In yet another embodiment, the first_$PES_i(j)$ is compared to a threshold, and if the first_$PES_i(j)$ exceeds the threshold, the first_$PES_i(j)$ is regenerated for at least one of the servo sectors j corresponding to a circumferential location of the spiral track. In one embodiment, the first_$PES_i(j)$ is regenerated during a subsequent revolution of the disk using the same servo sector. In another embodiment, the first_$PES_i(j)$ is regenerated using a different servo sector, and in one embodiment, the first_$PES_i(j)$ is regenerated during the same revolution of the disk.

In another embodiment, the distance delta D_Δ generated for a first spiral track is saved, and a difference is generated between the distance delta D_Δ generated for a second spiral track and the distance delta D_Δ generated for the first spiral track. If the difference exceeds a threshold, the at least one of the starting radial location and the velocity profile is adjusted in response to the distance delta D_Δ generated for the first spiral track. The second spiral track is written to the disk using the starting radial location and the velocity profile.

Another embodiment of the present invention comprises a disk drive including a disk, a head actuated over the disk, and control circuitry operable to write M spiral tracks (i=1 to M) to the disk. The head is positioned over a first radial location and a first concentric reference track is written, the first concentric reference track comprising N concentric servo sectors. Prior to writing one of the spiral tracks, the head is positioned over the first concentric reference track to read the first concentric reference track. A position error signal first_$PES_i(j)$ is generated for at least one of the servo sectors j in the first concentric reference track, wherein the first_$PES_i(j)$ represents an offset of the head from the first radial location, and the servo sector j corresponds to a circumferential location of the spiral track. At least one of a starting radial location and a velocity profile is adjusted in response to the first_$PES_i(j)$, and the spiral track is written to the disk using the starting radial location and the velocity profile.

DETAILED DESCRIPTION OF EMBODIMENTS OF THE INVENTION

An embodiment of the present invention comprises a method of writing M spiral tracks (i=1 to M) to a disk of a disk drive. A head is positioned over a first radial location and a first concentric reference track is written, the first concentric reference track comprising N concentric servo sectors. Prior to writing one of the spiral tracks, the head is positioned over the first concentric reference track to read the first concentric reference track, and a position error signal first_$PES_i(j)$ is generated for at least one of the servo sectors j in the first concentric reference track, wherein the first_$PES_i(j)$ represents an offset of the head from the first radial location, and the servo sector j corresponds to a circumferential location of the spiral track. At least one of a starting radial location and a velocity profile is adjusted in response to the first_$PES_i(j)$, and the spiral track is written to the disk using the starting radial location and the velocity profile.

Figure 2A:
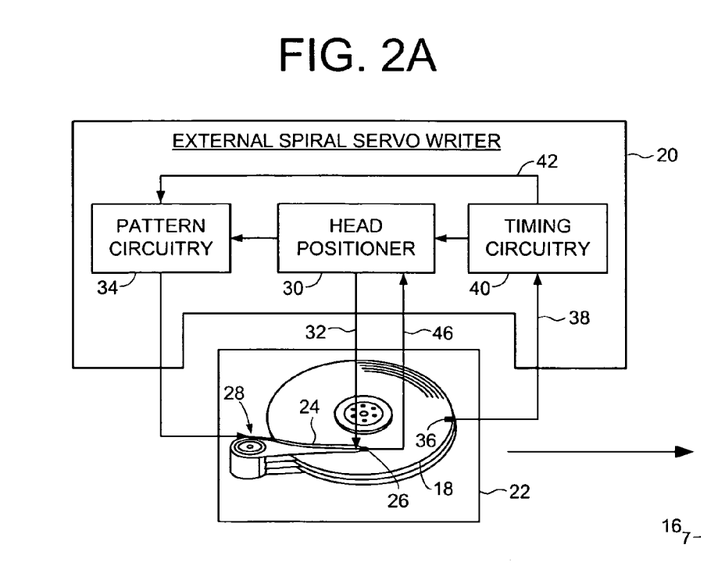
FIGS. 2A-2B show an external servo writer for writing a first concentric reference track at an a outer diameter of the disk, and a second concentric reference track at an inner diameter of the disk, wherein the concentric reference tracks are processed to compensate for uniform and non-uniform thermal expansion while writing a plurality of spiral tracks to the disk.
Figure 2B:
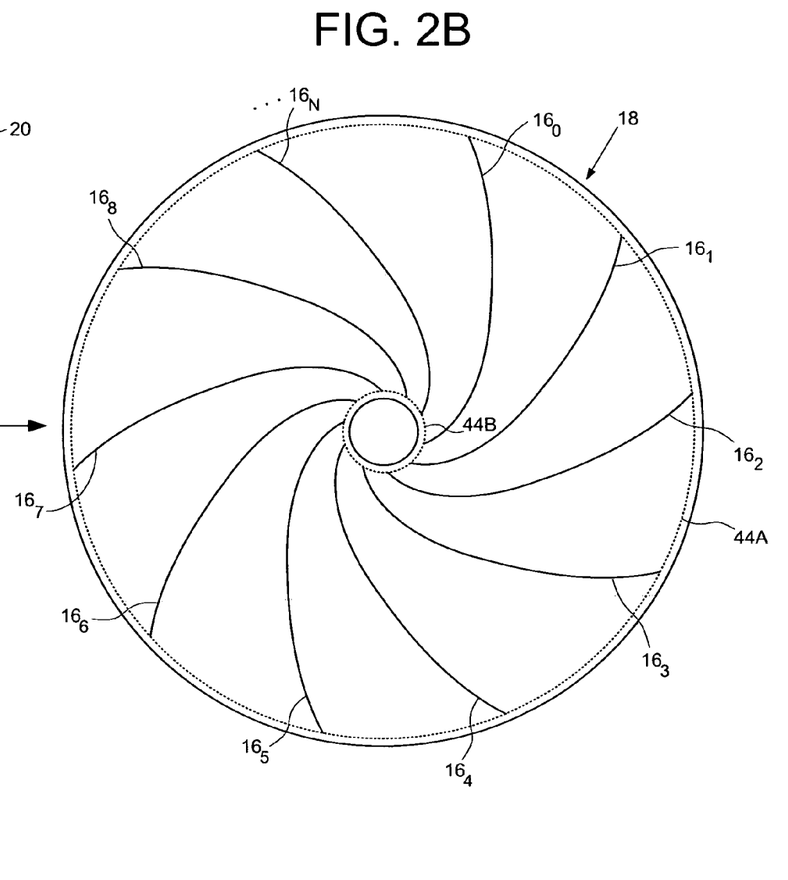

The spiral tracks may be written to the disk using any suitable technique, such as using an external spiral servo writer which writes the spiral tracks to the disk after being installed into the head disk assembly (HDA) of the disk drive. Alternatively, the spiral tracks may be written on the disk using an external media writer, and then installing one or more of the disks into the HDA. In yet another embodiment described below, the spiral tracks are "self written" by each disk drive using an internal position encoder and the internal control circuitry. FIGS. 2A and 2B show an embodiment wherein a plurality of spiral tracks $16_0$-$16_N$ are written to a disk 18 using an external spiral servo writer 20. The disk drive comprises a head disk assembly (HDA) 22 comprising the disk 18, an actuator arm 24, a head 26 coupled to a distal end of the actuator arm 24, and a voice coil motor 28 for rotating the actuator arm 24 about a pivot to position the head 26 radially over the disk 18. A write clock is synchronized to the rotation of the disk 18, and the plurality of spiral tracks $16_0$-$16_N$ are written on the disk 18 at a predetermined circumferential location determined from the write clock. In one embodiment, each spiral track $16_i$ comprises a high frequency signal interrupted at a predetermined interval by a sync mark.

The external spiral servo writer 20 comprises a head positioner 30 for actuating a head positioning pin 32 using sensitive positioning circuitry, such as a laser interferometer. Pattern circuitry 34 generates the data sequence written to the disk 18 for the spiral tracks $16_0$-$16_N$. The external spiral servo writer 20 inserts a clock head 36 into the HDA 22 for writing a clock track at an outer diameter of the disk 18. The clock head 36 then reads the clock track to generate a clock signal 38 processed by timing recovery circuitry 40 to synchronize the write clock 42 for writing the spiral tracks $16_0$-$16_N$ to the disk 18. The timing recovery circuitry 40 enables the pattern circuitry 34 at the appropriate time relative to the write clock 42 so that the spiral tracks $16_0$-$16_N$ are written at the appropriate circumferential location. The timing recovery circuitry 40 also enables the pattern circuitry 34 relative to the write clock 42 to write the sync marks within the spiral tracks $16_0$-$16_N$ at the same circumferential location from the outer diameter to the inner diameter of the disk 18. The constant interval between sync marks (independent of the radial location of the head 26) enables a servo write clock to maintain synchronization while writing the product servo sectors to the disk.

Figure 3:
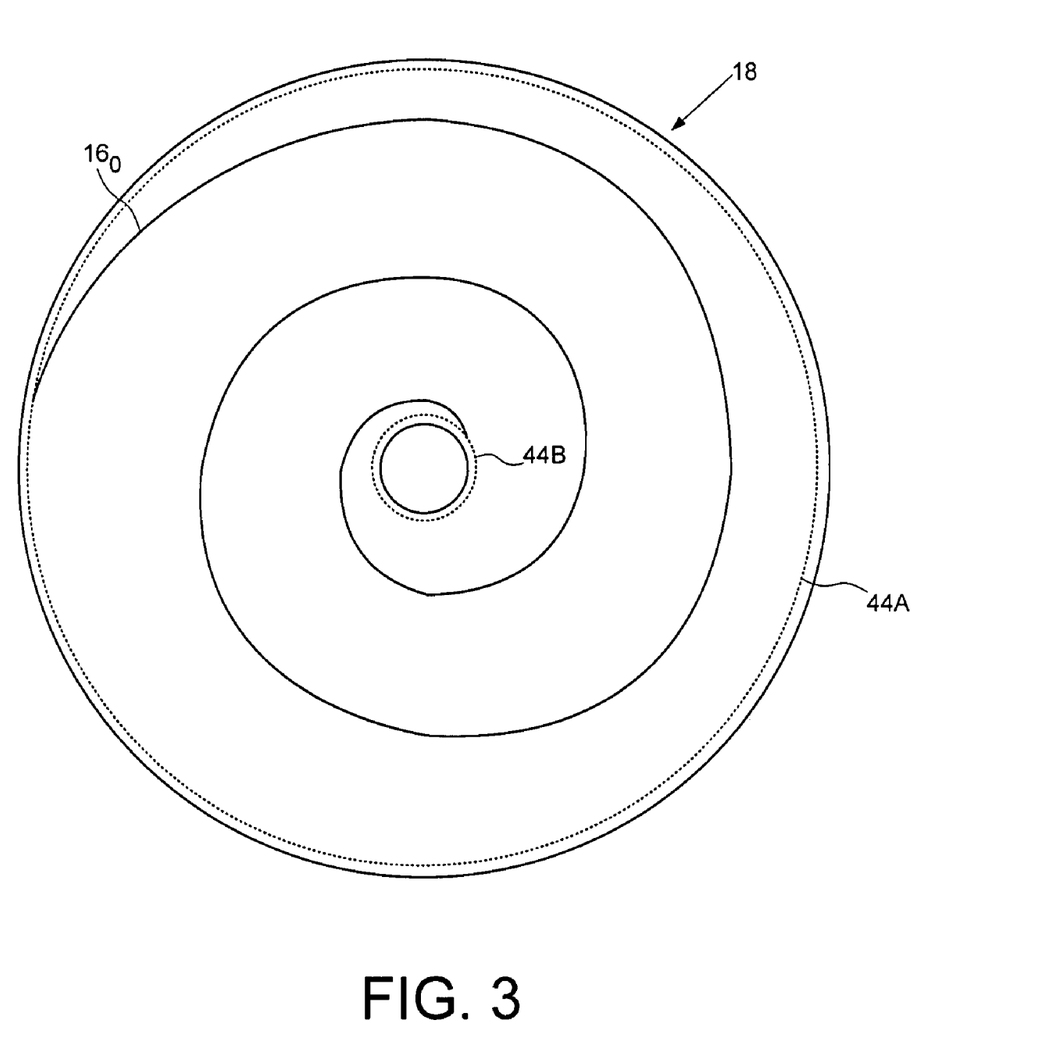
FIG. 3 shows an embodiment of the present invention wherein each spiral track is written over multiple disk revolutions.

In the embodiment of FIG. 2B, each spiral track $16_i$ is written over a partial revolution of the disk 18. In an alternative embodiment, each spiral track $16_i$ is written over one or more revolutions of the disk 18. FIG. 3 shows an embodiment wherein each spiral track $16_i$ is written over multiple revolutions of the disk 18.

Figure 4:
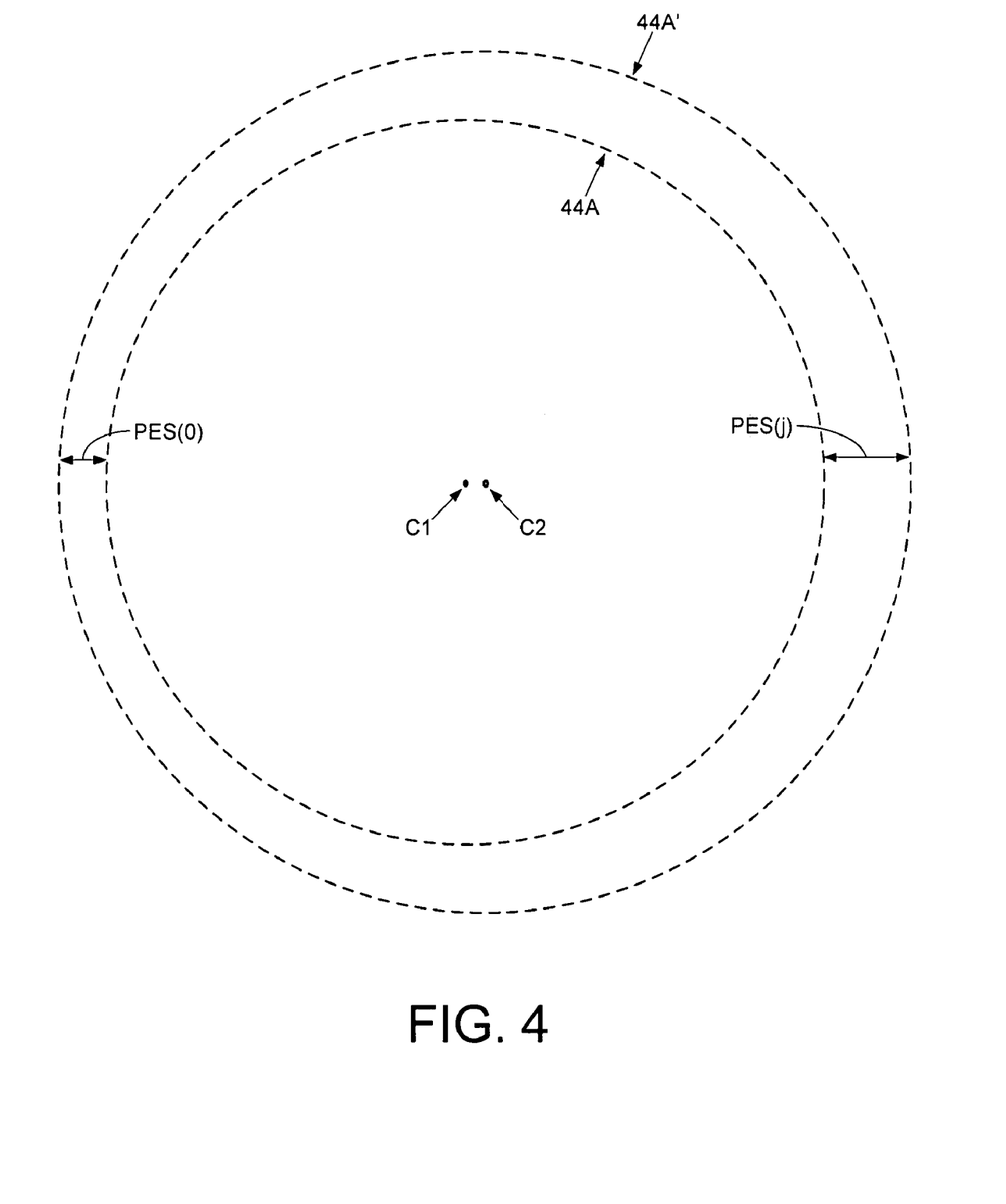
FIG. 4 illustrates an embodiment of the present invention wherein a position error signal PES is generated for a concentric reference track in order to estimate and compensate for the uniform and non-uniform thermal expansion that occurs while writing the spiral tracks to the disk.

In one embodiment, the head positioner 30 actuates the head positioning pin 32 from a starting radial location near the outer diameter of the disk to an ending radial location near the inner diameter of the disk. The head positioning pin 32 is moved according to a velocity profile that ensures the shape of each spiral track remains substantially constant (and therefore the spacing between the spiral tracks remains substantially constant). To facilitate this, the head positioner 30 positions the head 26 at a first radial location (using an internal encoder) and writes a concentric reference track 44A at the first radial location (e.g., at the outer diameter of the disk 18). During the process of writing the spiral tracks to the disk 18, the radial location of the concentric reference track 44A may shift relative to the head positioning pin 32 due to thermal expansion. That is, the radial location of the concentric reference track 44A may shift relative to the first radial location used by the head positioner 30 to initially write the concentric reference track 44A. This is illustrated in FIG. 4 which shows the initial radial location of the concentric reference track 44A, and the corresponding concentric reference track 44A' after thermal expansion. Note that the thermal expansion may include a uniform expansion component relative to an initial center C1 of the concentric reference track 44A, as well as a non-uniform component which is effectively like shifting the center of the concentric reference track to C2.

As the various components expands (e.g., the disk 18), the starting location of each spiral track changes as well as the length of each spiral track. Thus, prior to writing each spiral track the head positioner 30 detects the offset of the concentric reference track 44A relative to its initial radial location (as determined by the encoder internal to the head positioner 30). This offset is then used by the head positioner 30 to adjust at least one of a starting radial location as well as a velocity profile used to write each spiral track to the disk.

In one embodiment, the concentric reference track comprises N concentric servo sectors similar to the conventional servo sector $2_4$ shown in FIG. 1. Prior to writing a spiral track, the head positioner 30 searches for the radial location of the concentric reference track 44A by processing the read signal 46 emanating from the head 26 and detecting a sync mark recorded in the servo sector. Once the concentric reference track 44A is located, the head positioner 30 may "lock" the radial position of the head 26 while reading the remaining servo sectors. In one embodiment, a band of concentric reference tracks are written at the first radial location and the center track within the band is selected as the concentric reference track 44A. This embodiment may facilitate generating the PES even if the head 26 deviates several tracks away from the concentric reference track 44A as the disk rotates. In an alternative embodiment, the head positioner 30 may track a centerline of the concentric reference track 44A by actuating the head positioning pin 32 in response to the PES to thereby track the radial deviation of the head 26 as the disk rotates. In either case, as each servo sector is read, any additional offset detected from the servo bursts 14 (FIG. 1) is included in the PES representing the offset from the initial radial location of the concentric reference track (as determined by the encoder in the head positioner 30).

Any suitable ratio of servo sectors within the concentric reference track 44A and spiral tracks may be employed in the embodiments of the present invention. In one embodiment, the ratio is 1:1 meaning that one spiral track is written between each servo sector in the concentric reference track 44A. Before writing each spiral, a PES is generated for the corresponding servo sector in the concentric reference track 44A and used to adjust at least one of the starting radial location and the velocity profile for writing the spiral track.

Figure 5:
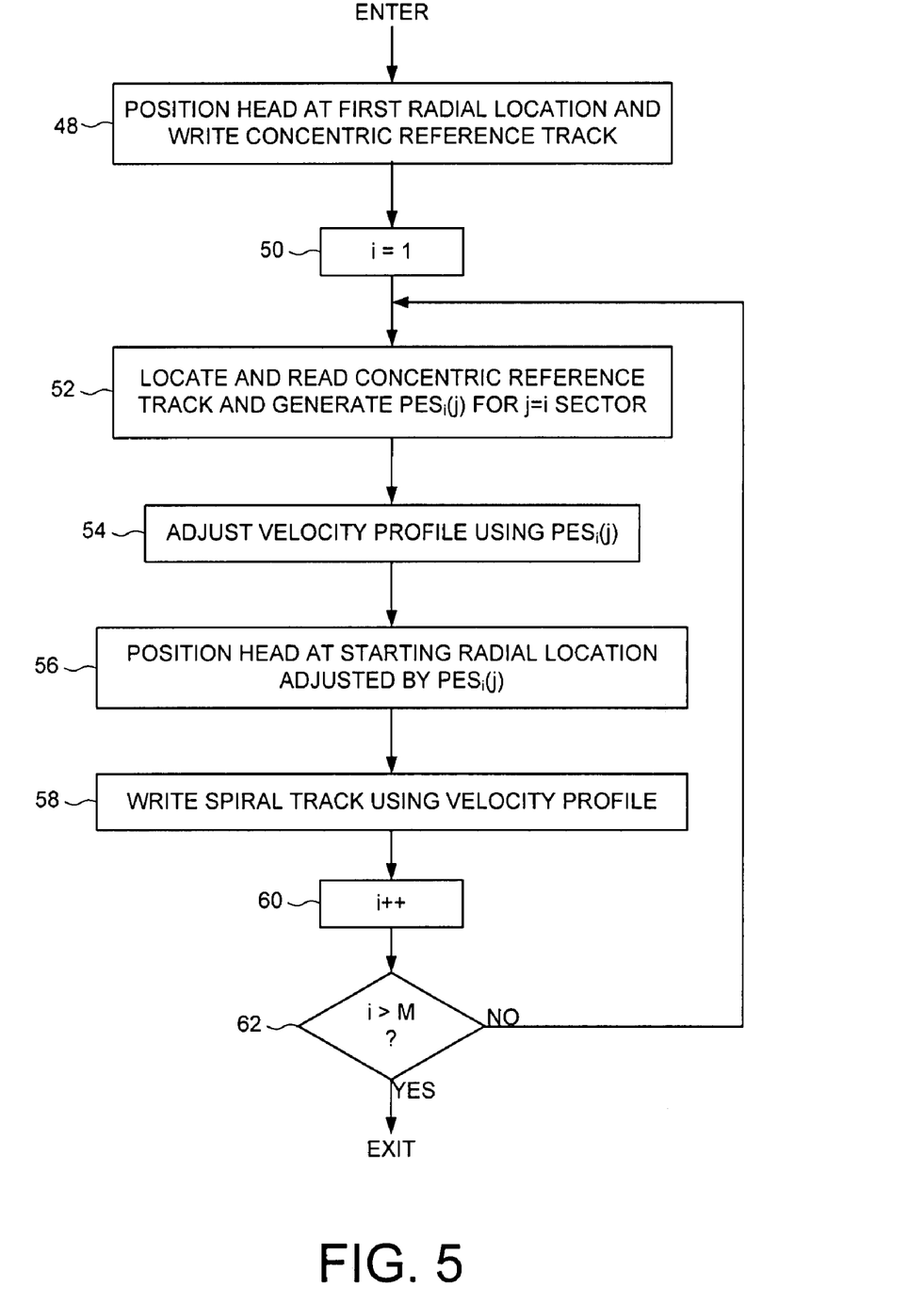
FIG. 5 is a flow diagram according to an embodiment of the present invention wherein a PES is generated for a servo sector in the concentric reference track corresponding to a spiral track to be written to the disk which is used to adjust at least one of a starting radial location and a velocity profile used to write the spiral track.

FIG. 5 is a flow diagram according to an embodiment of the present invention wherein at step 48 the external spiral servo writer 20 positions the head 26 at a first radial location (e.g., near the outer diameter of the disk) and writes at least one concentric reference track 44A (or band of tracks). At step 50 an index i which represents the current spiral track to be written is initialized to one. At step 52 the concentric reference track 44A is located and read to generate a $PES_i(j)$ for j=i sector in the concentric reference track 44A. At step 54 the velocity profile is adjusted using the $PES_i(j)$ to account for thermal expansion. The velocity profile may be adjusted in any suitable manner, such as by multiplying an initial velocity profile by a suitable scalar. At step 56 the head positioner 30 positions the head 26 at a starting radial location adjusted by the $PES_i(j)$ which accounts for thermal expansion, and at step 58 the spiral track is written to the disk using the velocity profile. At step 60 the index i is incremented and the flow diagram is re-executed starting at step 52 until all of the spiral tracks have been written at step 62 (i>M).

In another embodiment, the repeatable runout of the concentric reference track 44A after being written to the disk is detected and used to adjust the offset due to thermal expansion. This embodiment is illustrated in the flow diagram of FIG. 6 wherein at step 64 the external spiral servo writer 20 positions the head 26 at a first radial location (e.g., near the outer diameter of the disk) and writes at least one concentric reference track 44A (or band of tracks). At step 66 the concentric reference track 44A is immediately read and a $PES_0(n)$ is generated and saved for each servo sector (n=1 to N). At step 68 an index i which represents the current spiral track to be written is initialized to one. At step 70 the concentric reference track 44A is located and read to generate a $PES_i(j)$ for j=i sector in the concentric reference track 44A. At step 72 a distance delta $D\_\Delta$ is generated as the difference between the initial $PES_0(j)$ and the just generated $PES_i(j)$. At step 74 the velocity profile is adjusted using the $D\_\Delta$ to account for thermal expansion, at step 76 the head positioner 30 positions the head 26 at a starting radial location adjusted by the $D\_\Delta$ which accounts for thermal expansion, and at step 78 the spiral track is written to the disk using the velocity profile. At step 80 the index i is incremented and the flow diagram is re-executed starting at step 70 until all of the spiral tracks have been written at step 82 (i>M).

Figure 6:
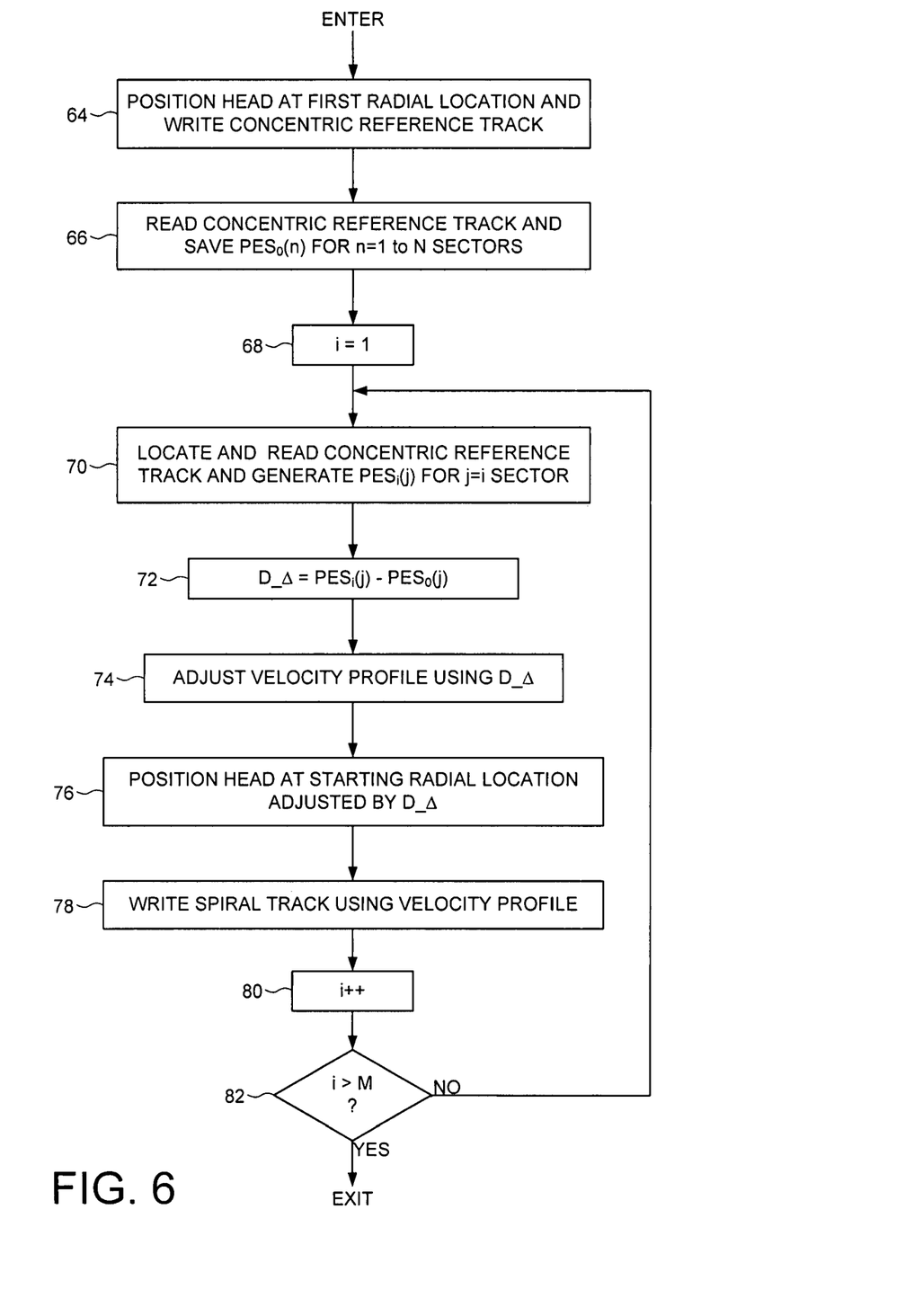
FIG. 6 is a flow diagram according to an embodiment of the present invention wherein an initial PES is generated for each servo sector in a concentric reference track which is then compared to a current PES prior to writing a spiral track to the disk.

In one embodiment, the initial $PES_0(n)$ is generated by generating a PES for each servo sector over a number of disk revolutions and averaging the PES generated for each servo sector in order to help filter out non-repeatable runout from the PES measurement. Similarly, in one embodiment the $PES_0(j)$ for writing a spiral track is generated by averaging the PES over multiple disk revolutions for servo sector j in order to help filter out random noise not caused by thermal expansion.

Figure 7A:
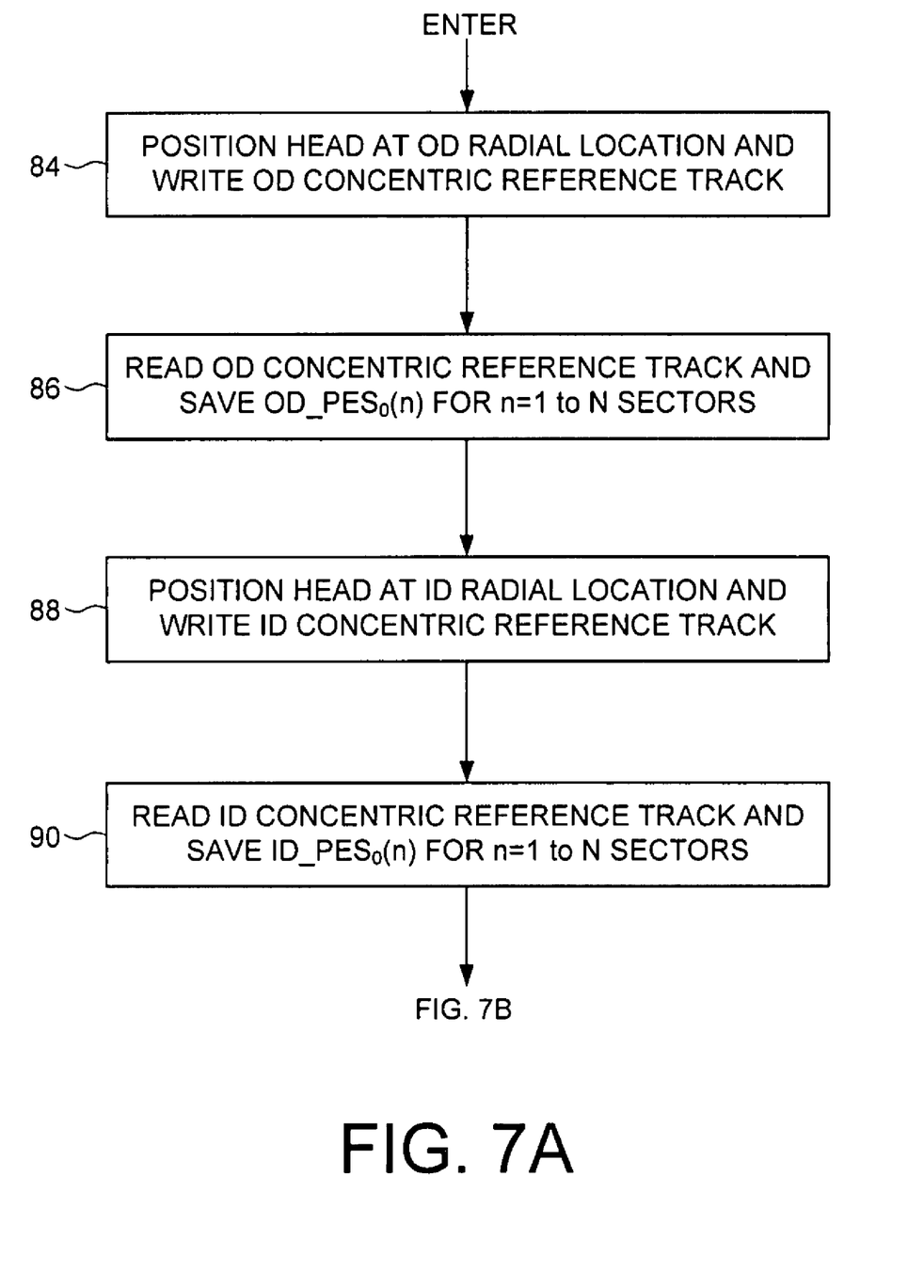
FIG. 7A is a flow diagram according to an embodiment of the present invention wherein a concentric reference track is written at both an outer diameter and inner diameter of the disk.

In another embodiment, more than one concentric reference track is written at different radial locations to better estimate the effect of thermal expansion. For example, in the embodiment shown in FIG. 2B a concentric reference track 44A (or band of tracks) is written at an outer diameter of the disk 18, and a concentric reference track 44B (or band of tracks) is written at an inner diameter of the disk 18. This embodiment is illustrated in the flow diagram of FIG. 7A wherein at step 84 the external spiral servo writer 20 positions the head 26 at an outer diameter (OD) radial location and writes at least one concentric reference track 44A (or band of tracks). At step 86 the OD concentric reference track 44A is immediately read and a $OD\_PES_0(n)$ is generated and saved for each servo sector (this step is optional). At step 88 the external spiral servo writer 20 positions the head 26 at an inner diameter (ID) radial location and writes at least one concentric reference track 44B (or band of tracks). At step 90 the ID concentric reference track 44B is immediately read and a $ID\_PES_0(n)$ is generated and saved for each servo sector (this step is optional).

Figure 7B:
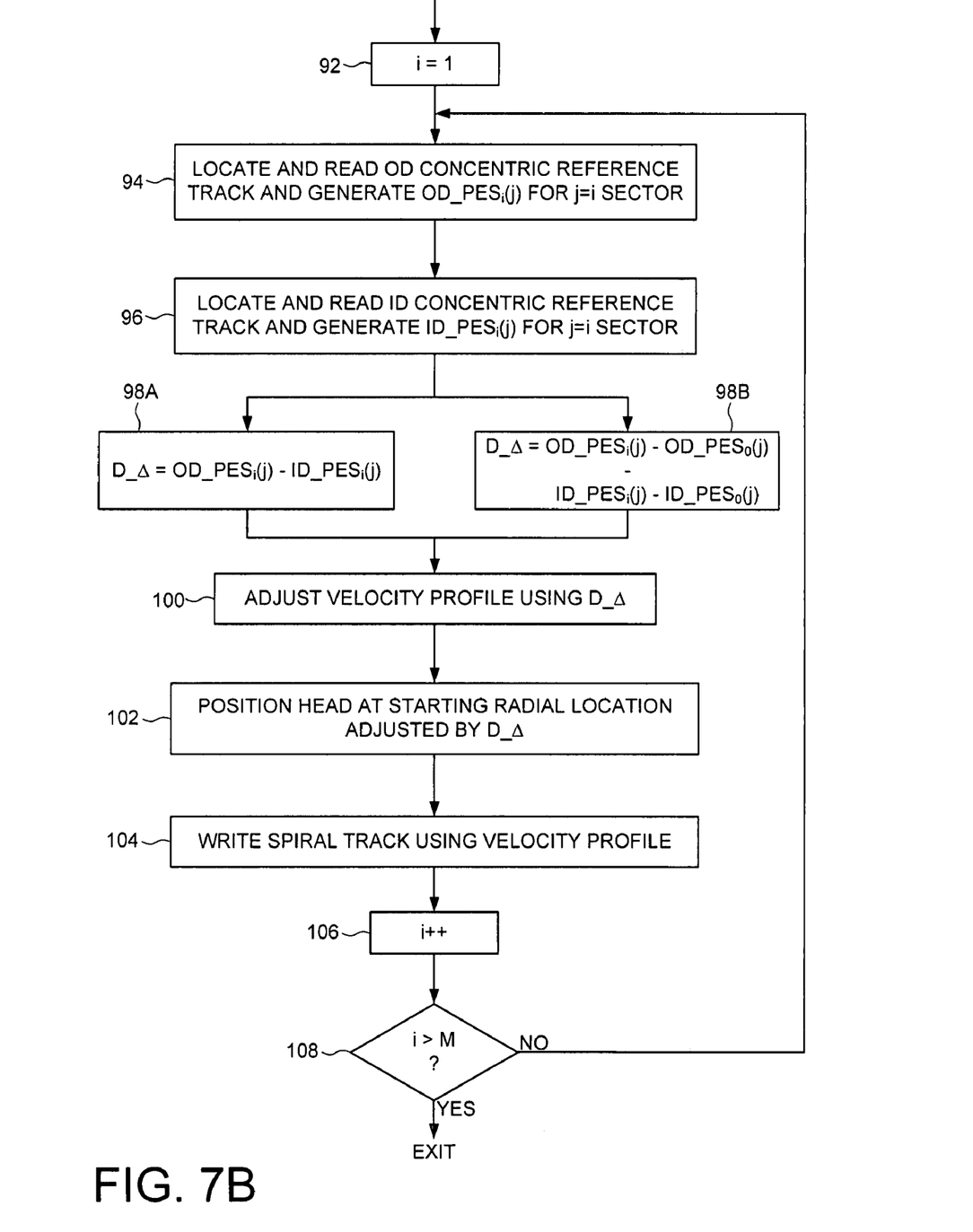
FIG. 7B is a flow diagram according to an embodiment of the present invention wherein both the outer diameter and inner diameter concentric reference tracks are used to adjust at least one of a starting radial location and a velocity profile used to write the spiral track.

Continuing to the flow diagram of FIG. 7B, at step 92 an index i which represents the current spiral track to be written is initialized to one. At step 94 the OD concentric reference track 44A is located and read to generate a $OD\_PES_i(j)$ for j=i sector in the concentric reference track 44A. At step 96 the ID concentric reference track 44B is located and read to generate a $ID\_PES_i(j)$ for j=i sector in the concentric reference track 44B. Step 98A or 98B is then executed to compute a distance delta $D\_\Delta$ in response to $OD\_PES_i(j)$ and $ID\_PES_i(j)$. At step 100 the velocity profile is adjusted using the $D\_\Delta$ to account for thermal expansion, at step 102 the head positioner 30 positions the head 26 at a starting radial location adjusted by the $D\_\Delta$ which accounts for thermal expansion, and at step 104 the spiral track is written to the disk using the velocity profile. At step 106 the index i is incremented and the flow diagram is re-executed starting at step 94 until all of the spiral tracks have been written at step 108 (i>M).

In one embodiment, the outlier PES and/or $D\_\Delta$ are detected and accounted for to avoid writing a spiral track using an invalid estimate of thermal expansion. This embodiment is illustrated in the flow diagram of FIG. 8A wherein at step 110 an index i which represents the current spiral track to be written is initialized to one. At step 112 the concentric reference track 44A is located and read to generate a $PES_i(j)$ for j=i sector in the concentric reference track 44A. If at step 114 the $PES_i(j)$ exceeds a predetermined threshold, the $PES_i(j)$ is regenerated at step 112 during a second revolution of the disk. These steps may also be executed for other concentric reference tracks, such as an ID concentric reference track 44B. Once the $PES_i(j)$ falls below the threshold at step 114, at step 116 a current $D\_\Delta_i$ is computed in response to the $PES_i(j)$ (e.g., using one of the techniques described above). If at step 118 the current $D\_\Delta_i$ exceeds a predetermined threshold, then at step 120 the current $D\_\Delta_i$ is assigned to the previous $D\_\Delta_{i-1}$ (i.e., the current $D\_\Delta_i$ is considered an outlier and not used). At step 122 the velocity profile is adjusted using the current $D\_\Delta_i$ to account for thermal expansion, at step 124 the head positioner 30 positions the head 26 at a starting radial location adjusted by the current $D\_\Delta_i$ which accounts for thermal expansion, and at step 126 the spiral track is written to the disk using the velocity profile. At step 128 the index i is incremented and the flow diagram is re-executed starting at step 112 until all of the spiral tracks have been written at step 130 (i>M).

Figure 8A:
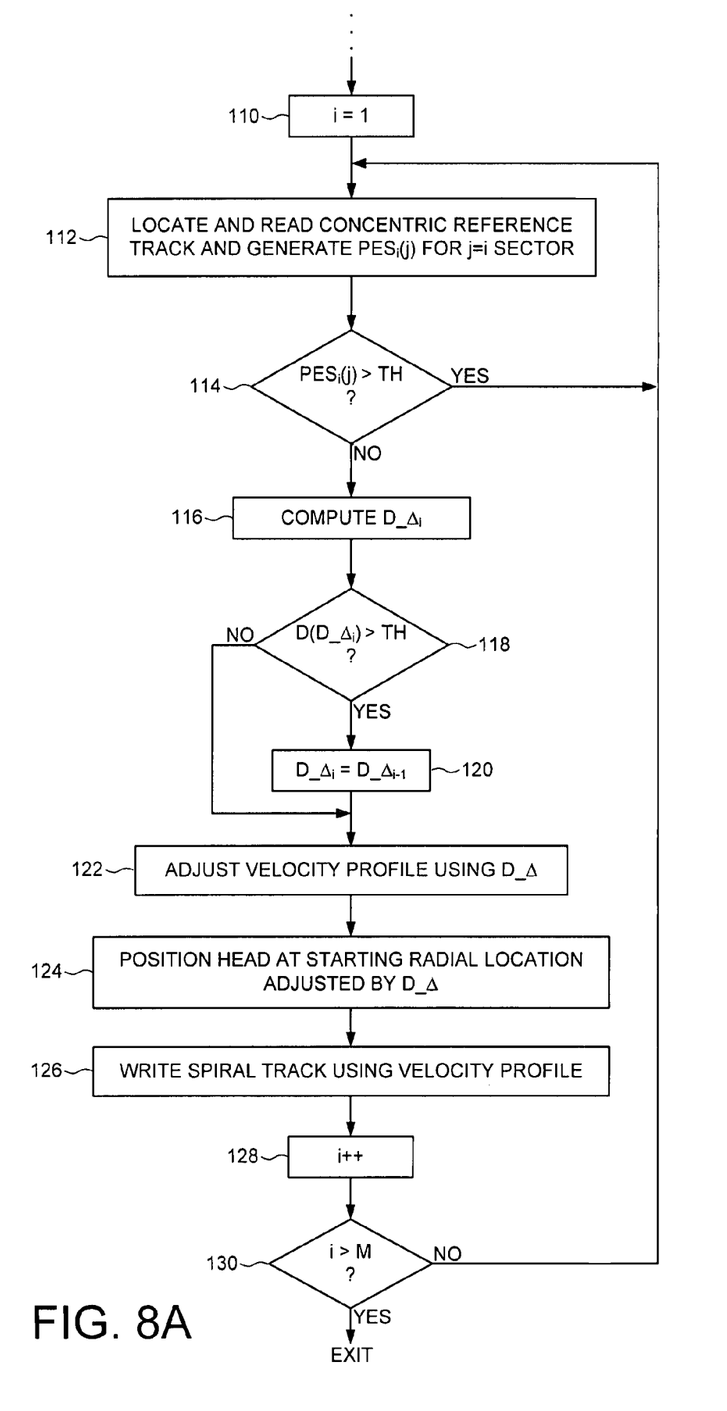
FIG. 8A is a flow diagram according to an embodiment of the present invention wherein outlier parameter values (e.g., PES) used to compensate for thermal expansion are ignored (filtered out).
Figure 8B:
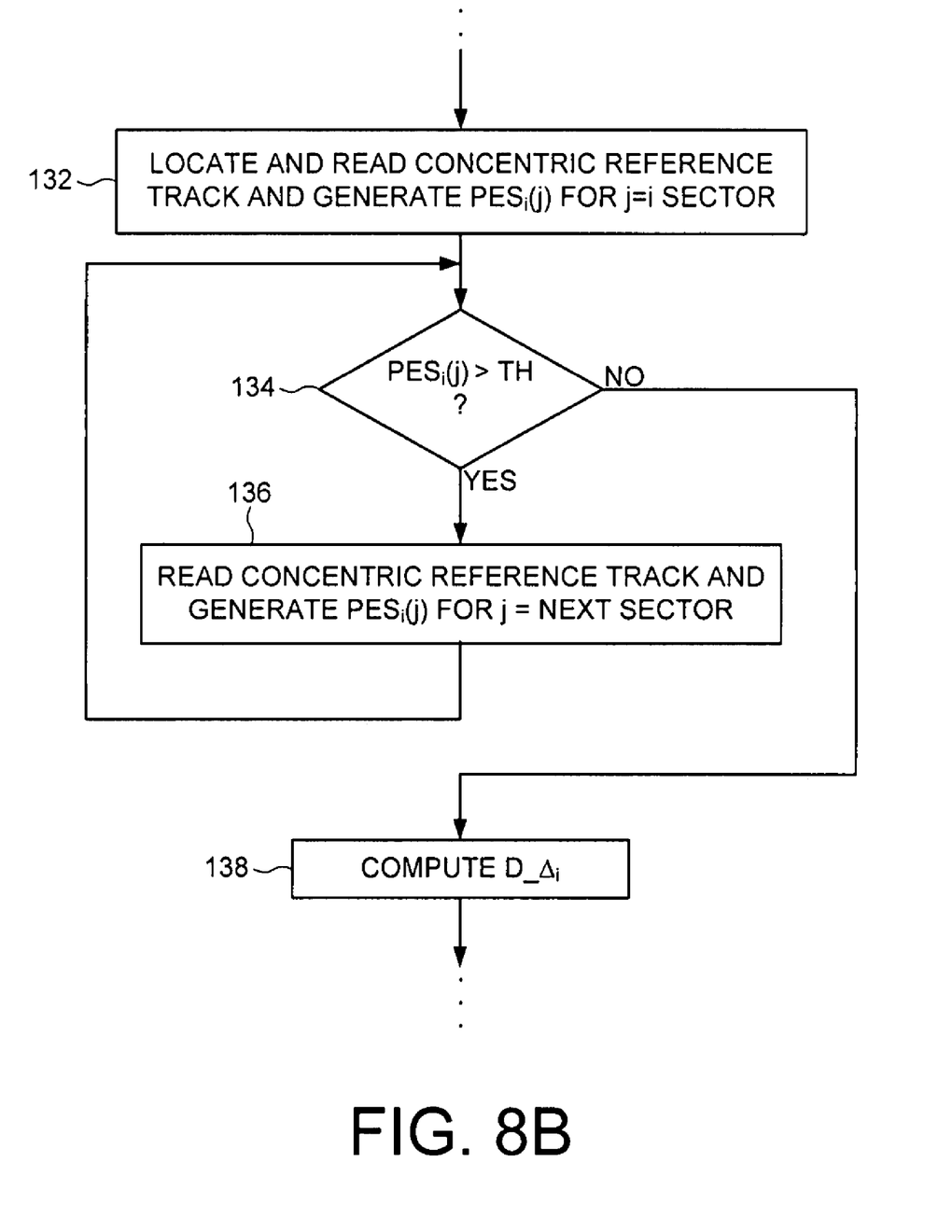
FIG. 8B is a flow diagram according to an embodiment of the present invention wherein if the PES generated for a servo sector exceeds a threshold, a PES is generated for the next servo sector.

An alternative embodiment for filtering out the PES outliers is illustrated in the flow diagram of FIG. 8B. At step 132 the concentric reference track 44A is located and read to generate a $PES_i(j)$ for j=i sector in the concentric reference track 44A. If at step 134 the $PES_i(j)$ exceeds a predetermined threshold, a $PES_i(j)$ is generated at step 136 for a following servo sector (e.g., servo sector j+1) during the same revolution of the disk until the PES falls below the threshold at step 134. At step 138 a current $D\_\Delta_i$ is computed in response to the $PES_i(j)$ (e.g., using one of the techniques described above), and the flow diagram continues (e.g., as shown in FIG. 8A).

Any suitable configuration may be employed to position the head 26 in order to write the concentric reference track(s) as well as the spiral tracks. In one embodiment, the concentric reference track(s) and spiral tracks are "self written" using the control circuitry within each disk drive. In this embodiment, each disk drive comprises a suitable position encoder, such as a suitable optical or magnetic encoder, for detecting the radial location of the head 26 when writing/reading the concentric reference track(s) as well as writing the spiral tracks.

What is claimed is:

1. A method of writing M spiral tracks (i=1 to M) to a disk of a disk drive, the method comprising:
    positioning a head over a first radial location;
    writing a first concentric reference track at the first radial location, the first concentric reference track comprising N concentric servo sectors;
    prior to writing one of the spiral tracks:
        positioning the head over the first concentric reference track, reading the concentric servo sectors in the first concentric reference track, and generating a position error signal $first\_PES_0(n)$ for each servo sector (n=1 to N) representing an offset from the first radial location;
        positioning the head over the first concentric reference track and reading the first concentric reference track;
        generating a position error signal $first\_PES_i(j)$ for at least one of the servo sectors j in the first concentric reference track, wherein the $first\_PES_i(j)$ represents an offset of the head from the first radial location, and the servo sector j corresponds to a circumferential location of the spiral track;
        generating a distance delta $D\_\Delta$ relative to a difference between the $first\_PES_0(j)$ and the $first\_PES_i(j)$, wherein at least one of a starting radial location and a velocity profile is adjusted in response to the distance delta $D\_\Delta$; and
        writing the spiral track to the disk using the starting radial location and the velocity profile.

2. The method as recited in claim 1, wherein adjusting at least one of the starting radial location and the velocity profile in response to the $first\_PES_i(j)$ compensates for uniform and non-uniform thermal expansion.

3. The method as recited in claim 1, further comprising:
    positioning the head over a second radial location;
    writing a second concentric reference track at the second radial location, the second concentric reference track comprising N concentric servo sectors;
    prior to writing one of the spiral tracks:
        positioning the head over the second concentric reference track and generating a position error signal $second\_PES_i(j)$ for at least one of the servo sectors j in the second concentric reference track representing an offset from the second radial location, the servo sector j corresponding to a circumferential location of the spiral track; and
        wherein at least one of the starting radial location and the velocity profile is adjusted in response to the $first\_PES_i(j)$ and the $second\_PES_i(j)$.

4. The method as recited in claim 3, wherein:
    the first radial location is near an outer diameter of the disk; and
    the second radial location is near an inner diameter of the disk.

5. The method as recited in claim 1, further comprising:
    comparing the $first\_PES_i(j)$ to a threshold; and if the first_PES$_i$(j) exceeds the threshold, regenerating the first_PES$_i$(j) for at least one of the servo sectors corresponding to a circumferential location of the spiral track.

6. The method as recited in claim 5, wherein the first_PES$_i$(j) is regenerated during a subsequent revolution of the disk using the same servo sector.

7. The method as recited in claim 5, wherein the first_PES$_i$(j) is regenerated using a different servo sector.

8. The method as recited in claim 7, wherein the first_PES$_i$(j) is regenerated during the same revolution of the disk.

9. The method as recited in claim 1, further comprising:
  saving the distance delta D_$\Delta$ generated for a first spiral track;
  generating a difference between the distance delta D_$\Delta$ generated for a second spiral track and the distance delta D_$\Delta$ generated for the first spiral track; and
  if the difference exceeds a threshold:
    adjusting the at least one of the starting radial location and the velocity profile in response to the distance delta D_$\Delta$ generated for the first spiral track; and
    writing the second spiral track to the disk using the starting radial location and the velocity profile.

10. A disk drive comprising:
  a disk;
  a head actuated over the disk; and
  control circuitry operable to write M spiral tracks (i=1 to M) to the disk by:
    positioning a head over a first radial location;
    writing a first concentric reference track at the first radial location, the first concentric reference track comprising N concentric servo sectors;
    prior to writing one of the spiral tracks:
      positioning the head over the first concentric reference track, reading the concentric servo sectors in the first concentric reference track, and generating a position error signal first_PES$_0$(n) for each servo sector (n=1 to N) representing an offset from the first radial location;
      positioning the head over the first concentric reference track and reading the first concentric reference track;
      generating a position error signal first_PES$_i$(j) for at least one of the servo sectors j in the first concentric reference track, wherein the first_PES$_i$(j) represents an offset of the head from the first radial location, and the servo sector j corresponds to a circumferential location of the spiral track;
      generating a distance delta D_$\Delta$ relative to a difference between the first_PES$_0$(j) and the first_PES$_i$(j), wherein at least one of a starting radial location and a velocity profile is adjusted in response to the distance delta D_$\Delta$; and
      writing the spiral track to the disk using the starting radial location and the velocity profile.

11. The disk drive as recited in claim 10, wherein adjusting at least one of the starting radial location and the velocity profile in response to the first_PES$_i$(j) compensates for uniform and non-uniform thermal expansion.

12. The disk drive as recited in claim 10, wherein the control circuitry is further operable to write the plurality of spiral tracks (i=1 to M) to the disk by:
  positioning the head over a second radial location;
  writing a second concentric reference track at the second radial location, the second concentric reference track comprising N concentric servo sectors;
  prior to writing one of the spiral tracks:
    positioning the head over the second concentric reference track and generating a position error signal second_PES$_i$(j) for at least one of the servo sectors j in the second concentric reference track representing an offset from the second radial location, the servo sector j corresponding to a circumferential location of the spiral track; and
    wherein at least one of the starting radial location and the velocity profile is adjusted in response to the first_PES$_i$(j) and the second_PES$_i$(j).

13. The disk drive as recited in claim 12, wherein:
  the first radial location is near an outer diameter of the disk; and
  the second radial location is near an inner diameter of the disk.

14. The disk drive as recited in claim 10, wherein the control circuitry is further operable to write the plurality of spiral tracks (i=1 to M) to the disk by:
  comparing the first_PES$_i$(j) to a threshold; and
  if the first_PES$_i$(j) exceeds the threshold, regenerating the first_PES$_i$(j) for at least one of the servo sectors corresponding to a circumferential location of the spiral track.

15. The disk drive as recited in claim 14, wherein the first_PES$_i$(j) is regenerated during a subsequent revolution of the disk using the same servo sector.

16. The disk drive as recited in claim 14, wherein the first_PES$_i$(j) is regenerated using a different servo sector.

17. The disk drive as recited in claim 16, wherein the first_PES$_i$(j) is regenerated during the same revolution of the disk.

18. The disk drive as recited in claim 10, further comprising:
  saving the distance delta D_$\Delta$ generated for a first spiral track;
  generating a difference between the distance delta D_$\Delta$ generated for a second spiral track and the distance delta D_$\Delta$ generated for the first spiral track; and
  if the difference exceeds a threshold:
    adjusting the at least one of the starting radial location and the velocity profile in response to the distance delta D_$\Delta$ generated for the first spiral track; and
    writing the second spiral track to the disk using the starting radial location and the velocity profile.

* * * * *